US007384490B2

(12) United States Patent
Nishikawa

(10) Patent No.: US 7,384,490 B2
(45) Date of Patent: Jun. 10, 2008

(54) METHOD FOR MANUFACTURING OPEN CELL RUBBER MATERIAL AND METHOD FOR MANUFACTURING RUBBER ROLLER

(75) Inventor: Takao Nishikawa, Osaka (JP)

(73) Assignee: Mitsumagiken Co. Ltd., Osaka (JP)

( * ) Notice: Subject to any disclaimer, the term of this patent is extended or adjusted under 35 U.S.C. 154(b) by 397 days.

(21) Appl. No.: 10/960,767

(22) Filed: Oct. 7, 2004

(65) Prior Publication Data

US 2005/0076996 A1  Apr. 14, 2005

(30) Foreign Application Priority Data

Oct. 8, 2003   (JP)   ............................. 2003-349960
Sep. 29, 2004  (JP)   ............................. 2004-284941

(51) Int. Cl.
  *B29C 65/52*  (2006.01)
  *B29C 67/20*  (2006.01)
(52) U.S. Cl. ...................... 156/79; 156/153; 156/294
(58) Field of Classification Search ................ 156/79, 156/153, 294
   See application file for complete search history.

(56) References Cited

U.S. PATENT DOCUMENTS 5,120,385 A * 6/1992 Takahashi et al. .......... 156/294
5,698,601 A * 12/1997 Welte et al. ................. 264/48
5,705,115 A * 1/1998 Haruno ....................... 264/321
2002/0028736 A1 * 3/2002 Kishino et al. .............. 492/50
2005/0261387 A1 * 11/2005 Stevenson et al. .......... 521/99

FOREIGN PATENT DOCUMENTS

| JP | 59-096924  | * | 6/1984 |
| JP | 02-188233  | * | 7/1990 |
| JP | 08-076627  | * | 3/1996 |
| JP | 10-204205  | * | 8/1998 |

* cited by examiner

*Primary Examiner*—Steven D Maki
(74) *Attorney, Agent, or Firm*—Carrier, Blackman & Associates P.C.; Joseph P. Carrier; William D. Blackman

(57) ABSTRACT

The object is to provide a manufacturing method of various elastic rollers whose rubber hardness is remarkably reduced.

A hollow cylindrical rubber tube (1) is prepared. Thereafter, a metal shaft (2) is inserted in the rubber tube and the rubber tube is secured to the shaft. Thereafter, a coating layer (1a) on the outer peripheral surface of the rubber tube is removed. The rubber roller is located in a chamber and is subject to one or more pressuring operations and one or more evacuating operations to transform the continuous cell rubber layer into an open cell rubber layer. After that, a fluororesin tube is provided to cover the rubber tube or silicone oil is impregnated in the rubber tube, in accordance with the purpose of use of the rubber roller. The rubber rollers produced by the manufacturing method of the rubber roller according to the present invention is deformable at each portion of the rubber layer thereof, depending on the external stress and, accordingly, various kinds of rubber rollers having a reduced hardness can be provided.

15 Claims, 3 Drawing Sheets

METHOD FOR MANUFACTURING OPEN CELL RUBBER MATERIAL AND METHOD FOR MANUFACTURING RUBBER ROLLER

BACKGROUND OF THE INVENTION

1. Field of the Invention

The present invention relates to a method for manufacturing an open cell rubber material from a continuous cell rubber material.

The present invention also relates to a method for manufacturing a rubber roller having a low rubber hardness.

Moreover, the present invention relates to a method for manufacturing a pressure roller used in a heat roll fixing device and in particular a pressure roller having a low rubber hardness and a method for manufacturing the same.

2. Description of the Related Art

In a copier or printer, a heat roll fixing device is used to fix a non-fixed toner image. The heat roll fixing device is comprised of a heat roller having therein a heater and a pressure roller having an elastic rubber layer. The heat roller and the pressure roller are in press-contact with each other through a press contact mechanism. The pressure roller is comprised of a metal shaft, an elastic rubber layer formed on the outer peripheral surface of the metal shaft and a fluororesin tube which surrounds the elastic rubber layer. As the pressure roller rotates in contact with the heat roller having a high temperature, the elastic rubber layer must be heat-resistant and, to this end, is made of a silicone rubber. In this heat roll fixing device, a non-fixed toner image transferred onto a recording paper is molten and fixed onto the recording paper during passage through a nip at which the heat roller and the pressure roller come into contact with each other. In order to enhance the fixing efficiency of the heat roll fixing device, it is preferable that the nip width, i.e., the contact width of the heat roller and the pressure roller be as large as possible. The nip width can be increased by increasing the pressing force of the press contact mechanism of the heat roller and the heat roller. However, an increase in the pressing force invites bending of the pressure roller, thus leading to failure to form a nip having a uniform width in the axial direction of the roller. If the rubber hardness of the elastic rubber layer of the pressure roller is reduced, a wide nip width can be obtained even by a relatively low pressing force. Therefore, there has been need of development of a pressure roller having a heat resistant elastic rubber layer of a low rubber hardness.

In a heat roll fixing device, an oil supply roller is used to supply silicone oil to the heat roller to thereby enhance the releasing efficiency of the heat roller. As the oil supply roller requires a high oil containability, an open cell urethane rubber roller having a large number of pores is used.

Furthermore, in an electro photographic copier or printer, a developing roller is provided adjacent to a photosensitive drum to develop an electrostatic latent image formed on the photosensitive drum. A toner is supplied to the developing roller through the toner supply roller. In the toner supply mechanism, if the hardness of the toner supply roller is high, an undesirable friction occurs between the toner supply roller and the developing roller, so that the toner cannot be stably supplied. Therefore, the toner supply roller requires an elastic rubber layer having a lower hardness to stably supply a predetermined amount of toner to the developing roller.

In order to reduce the hardness of the silicone rubber layer used for the pressure roller of a fixing device, it is possible to use a foaming silicone rubber material. The foaming silicone rubber has therein a large number of cells and, hence, the rubber hardness thereof can be made much smaller than a solid silicone rubber material. However, the foaming silicone rubber material is of a continuous cell type, and accordingly, if the pressure roller rotates in contact with the high temperature heat roller, the temperature of the pressure roller is increased. As a result, the gas in the cells is expanded, thus resulting in an increase in the roller diameter. The increase in the roller diameter causes an increase of the diameter of the fluororesin tube formed on the outer peripheral surface of the silicone rubber layer. If the temperature of the pressure roller is reduced to a room temperature after the fixing device is used, the volume of the gas in the cells of the pressure roller is reduced, so that the diameter of the pressure roller is reduced. Consequently, the fluororesin tube which constitutes the outermost layer is wrinkled. The wrinkled fluororesin layer or tube of the pressure roller considerably reduces the fixing efficiency of the fixing device and affects a smooth movement of the recording paper.

The known oil supply roller is made of an open cell urethane rubber having high porosity and, accordingly, the oil supply roller exhibits a high oil containability but is less heat-resistant, due to a low heat resistance of a urethane rubber. This problem can be solved if the oil supply roller is made of a foaming silicone rubber. However, as a foaming silicone rubber has a continuous cell structure in which the cells are independent from each other, it is impossible to externally fill each cell with silicone oil. Consequently, the amount of silicone oil which can be contained in the oil supply roller is restricted.

Moreover, as the known toner supply roller is made of EPDM rubber of a continuous cell sponge of silicone rubber, the roller hardness is limited approximately to 20° (ASCA C). In addition to the foregoing, if the toner supply roller is used for long time, the rubber hardness is undesirably increased. Under these circumstances, in order to stably supply a toner, a toner supply roller having a lower rubber hardness has been needed.

SUMMARY OF THE INVENTION

It is an object of the present invention is to provide a method for manufacturing a rubber material whose hardness is low and which exhibits a high heat resistance.

Another object of the present invention is to provide a method for manufacturing an elastic rubber roller having a low rubber hardness.

Another object of the present invention is to provide a pressure roller having a low rubber hardness and a method for manufacturing the same.

Yet another object of the present invention is to provide an oil supply roller which has a high heat resistance and which can contain therein an increased amount of oil.

Still yet another object of the present invention is to provide a toner supply roller having a low rubber hardness.

According to the present invention, there is provided a method for manufacturing an open cell rubber material in which a continuous rubber material having a large number of independent cells which are isolated by separation walls is transformed into an open cell rubber material having pores connected to the atmosphere, comprising the steps of; compressing the cells contained in the continuous cell rubber material by increasing the internal pressure in a chamber in which the continuous cell rubber material is located; and decompressing the chamber rapidly to thereby expand the compressed cells rapidly whereby holes or cracks are formed in the separation walls between the adjacent cells, wherein during the decompressing step, the cells contained in the continuous cell rubber material are at least partly transformed into pores which are connected to the atmosphere through the holes or cracks formed in the separation walls.

As a result of the inventor's experiments and analysis, it has been found that it is useful to use open cell rubber material to reduce the rubber hardness of the various rollers as mentioned above. Namely, in a foaming rubber material, the amount of rubber for a unit volume is very small, the rubber hardness of the foaming rubber material itself can be made low. However, if a pressing force is exerted on the continuous cell rubber material having independent cells, a large elastic restitution due to the gas contained in the cells occurs, and therefore the reduction of the rubber hardness is limited. On the other hand, if an open cell rubber material is subject to a pressing force, the gas in the cells is discharged to the outside through the holes, etc., connecting the adjacent cells. Consequently, the rubber material can be freely deformed depending on the magnitude of the pressing force to thereby largely reduce the rubber hardness. Therefore, for example, further reduction of the rubber hardness of, for example, the pressure roller used in a heat roll fixing device can be easily achieved by the use of an open cell silicone rubber. However, it is very difficult to produce an open cell silicone rubber by the conventional silicone rubber production technology. Also, the manufacturing cost is greatly increased.

The inventor of the present invention has conducted experiments and analyzed the results regarding the production of an open cell rubber material from a continuous rubber material and has found the following matters. When a continuous cell rubber material is highly pressurized in a chamber, the gas in the independent cells is compressed, so that the expansion energy is accumulated. When the chamber is rapidly evacuated thereafter, the gas in the chamber is instantly expanded, and consequently, the fine holes or cracks are formed in the thin separation walls by which the adjacent cells are isolated, due to the expansion energy thus produced. For instance, a continuous cell silicone rubber material is produced by adding a vulcanizing agent and a foaming agent and vulcanizing the same. The cells are isolated by thin separation walls of silicone rubber. When the continuous cell silicone rubber is pressurized under a high pressure atmosphere, the volume of the gas in the cells is reduced depending on the pressure and the pressure of the gas is considerably increased. If the high pressure is rapidly reduced to a normal pressure, the compressed gas of high pressure in the cells is instantly expanded. The energy produced by the rapid volume expansion of the gas is exerted on the rubber separation walls which isolate the cells, so that the weak portion of the thin separation walls are mechanically broken or destroyed, thus resulting in formation of fine holes or cracks in the separation walls. As a result, the cells are connected to the outside atmosphere through the holes or cracks formed in the separation walls. Thus, the continuous cell rubber material is transformed into an open cell rubber material. As the fine holes or cracks are formed only on the weak portions of the separation walls due to the volume expansion of the gas in the cells, the inherent elastic restitution efficiency of the rubber material is not affected. Moreover, due to the open cell rubber material into which the continuous cell rubber material has been transformed, the permanent set of the pressure roller by pressure can be improved.

The amount of the rubber for a unit volume in the foaming rubber material is very small and the each portion of the rubber material can be easily deformed without restriction, depending on the external pressure. Consequently, a rubber material whose rubber hardness is remarkably reduced can be obtained. Moreover, if the ambient temperature is increased, the air in the cells of the rubber material is discharged to the outside through the fine holes or cracks in the separation walls and, hence, no increase of the roller diameter takes place. Furthermore, as the cost for the pressurizing and rapid evacuation operations of the chamber is considerably low, the manufacturing cost can be largely reduced.

In the present invention, there is provided a method for manufacturing a rubber roller comprising the steps of;
cutting a cylindrical hollow rubber tube made of a continuous cell rubber material containing a large number of independent cells which are isolated by separation walls at a predetermined length,
producing a rubber roller having a continuous cell rubber layer by inserting a metal shaft coated with an adhesive layer in the cylindrical hollow rubber tube,
grinding the outer periphery of the rubber layer to remove the surface skin layer formed thereon,
compressing the cells in the continuous cell rubber layer by increasing the pressure in a chamber in which the rubber roller from which the skin layer has been removed is located, and
decompressing the chamber rapidly to thereby expand the compressed cells rapidly whereby holes or cracks are formed in the separation walls between the adjacent cells,
whereby the cells contained in the continuous cell rubber layer are at least partly transformed into pores which are connected to the atmosphere through the holes or cracks.

As mentioned above, it is preferable that the rubber hardness of a pressure roller, an oil supply roller or a toner supply roller, used in a heat roll fixing device heat roll be as small as possible. To produce such a rubber roller, it is known to vulcanize a rubber using a molding die assembly. However, the vulcanization requires a large number of molding dies, which increases the manufacturing cost. To prevent this problem, in the present invention, a pre-vulcanized and molded hollow cylindrical tube of a continuous cell rubber is used. As the hollow cylindrical rubber tube can be mass-produced by extrusion, the manufacturing cost is much less expensive than the vulcanization using the molding dies. In the present invention, a pre-vulcanized hollow cylindrical tube of a continuous cell rubber, having predetermined outer and inner diameters is prepared and is cut to a predetermined length. Thereafter, a metal shaft coated with an adhesive is inserted in the hollow cylindrical rubber tube to form a rubber roller. After that, the rubber roller is located in a chamber which is pressurized and evacuated to transform the continuous cell rubber into an open cell rubber. As a result, the various elastic rubber rollers having a low rubber hardness and can be produced at a low manufacturing cost.

Significance should be placed on the metal shaft inserted in the elastic rubber layer. Namely, when the expansion occurs following the occurrence of compression, the expansion energy is uniformly distributed in the radially outward direction of the shaft. Thus, the expansion energy can be more effectively utilized. As a result, the pressure in the tube during the pressurizing operation can be reduced or the number of the pressurizing and evacuating operations which are repeatedly carried out can be reduced.

The rubber tube produced by extrusion is provided on its outer peripheral surface with a thin surface skin layer. The inventor's experiments have revealed that the coating layer restricts the expansion during the evacuating operation. In view of this discovery, in the present invention, the outer periphery of the elastic rubber layer is ground to remove the surface skin layer, prior to the introduction of the rubber roller into the chamber. Due to the removal of the coating layer, the pressure in the pressurizing operation can be reduced.

The pressure in the pressurizing operation can be set in the range of 10 kg/cm$^2$ to 100 kg/cm$^2$, depending on the foaming factor of the continuous cell rubber material to be used. Various kinds of rubber materials in which independent cells separated by separation walls are formed upon foaming can be used for the continuous rubber material. For example, silicone rubber, EPDM rubber, or NBR rubber can be used.

The rubber roller used in this specification includes various kinds of elastic rubber rollers such as a pressure roller, an oil supply roller or a toner supply roller, used in a heat roll fixing device.

A method for manufacturing a pressure roller used in a heat roll fixing device, according to the present invention is characterized in that the method comprises the steps of;

producing a silicone rubber roller having a silicone rubber layer by inserting a metal shaft coated with an adhesive layer in a cylindrical hollow tube of a continuous cell silicone rubber having a large number of independent cells isolated by separation walls, grinding the outer periphery of the silicone rubber layer to remove the surface skin layer, compressing the cells in the continuous cell silicone rubber layer by increasing the pressure in a chamber in which the silicone rubber roller from which the skin layer has been removed is located, decompressing the chamber rapidly to thereby expand the compressed cells rapidly whereby holes or cracks are formed in the separation walls between the adjacent cells due to the rapid expansion, whereby the cells contained in the continuous cell silicone rubber layer are at least partly transformed into pores which are connected to the atmosphere through the holes or cracks, and attaching a fluororesin tube or forming a fluororesin coating layer onto the outer periphery of the silicone rubber layer having therein pores.

As the conventional pressure roller is made of a solid silicon rubber, the reduction of the hardness is limited. In the present invention in which a foaming silicone rubber is used and each cell is connected to the atmosphere, the rubber hardness can be dramatically reduced. Moreover, in the present invention, as a pre-vulcanized and molded silicone rubber tube is used in place of vulcanization of the rubber material using molding dies, the manufacturing cost can be reduced.

DETAILED DESCRIPTION OF THE PREFERRED EMBODIMENTS

Figure 1:
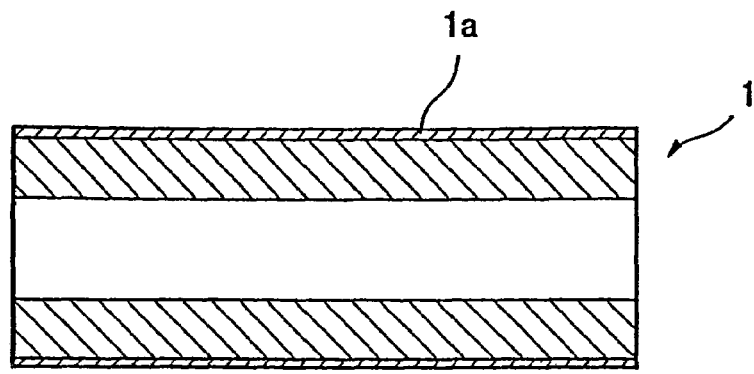
FIG. 1 is a diagram for explaining a series of manufacturing processes of a pressure roller according to the present invention.
Figure 1:
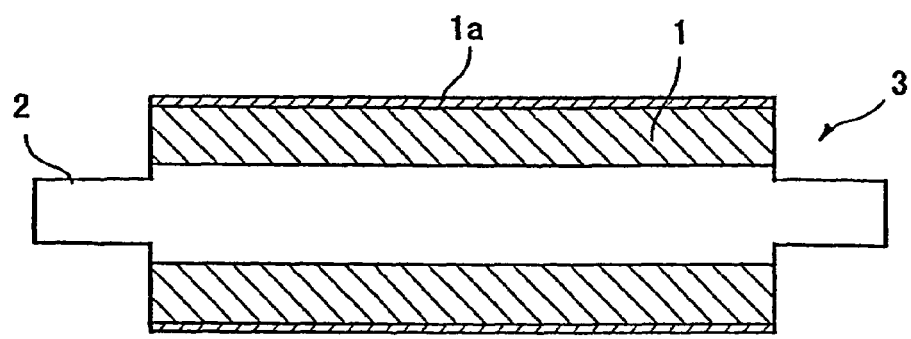
Figure 1:
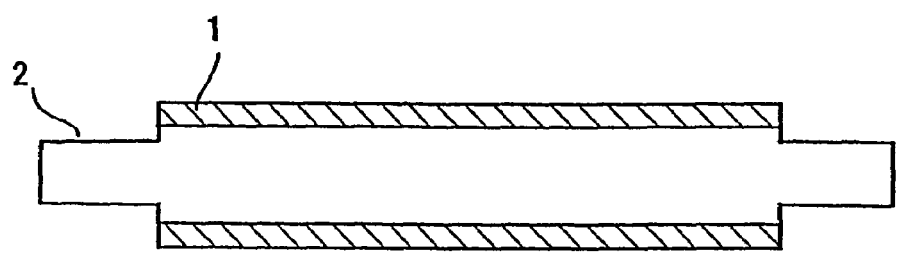
Figure 1:
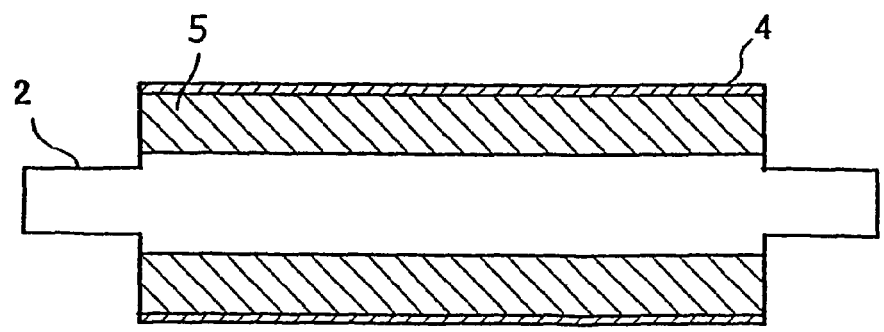

The present invention, applied to a method for manufacturing a pressure roller used in a heat roll fixing device, by way of example, will be discussed below. FIG. 1 shows a shape of a rubber material and a roller in a series of the manufacturing processes of a pressure roller. As shown in FIG. 1a, a continuous cell silicone rubber tube 1 having predetermined inner and outer diameters is prepared. The silicone rubber tube is formed into a hollow cylinder by extrusion of a silicone rubber material having a foaming agent added thereto. Thereafter, the tube is vulcanized. In the vulcanization step, the foaming agent foams, so that a continuous cell silicone rubber tube having therein a large number of independent cells is obtained. The volume rate of the cells in the silicone rubber tube is determined by the amount of the foaming agent to be added. Various silicone rubber tubes having various foaming factors can be used. The silicone rubber tube is cut to a predetermined length of a roller. Note that the silicone rubber tube 1 is provided on its inner and outer peripheral surfaces with thin surface skin layers 1a. For clarity, the skin layer formed on the inner peripheral surface is not shown in the drawings.

Thereafter, a metal shaft 2 is prepared. The outer peripheral surface of the metal shaft 2 is coated with an adhesive. The metal shaft 2 is inserted in the rubber tube 1. The inner diameter of the rubber tube 1 is slightly smaller than the outer diameter of the metal shaft 2, so that the metal shaft 2 is press-fitted in the rubber tube 1. Consequently, a silicone rubber roller 3 in which the metal shaft 2 is adhered to the silicone rubber layer 1 is obtained, as shown in FIG. 1b.

The outer peripheral surface of the silicone rubber layer 1 is ground to remove the coating layer 1a. The removal of the surface skin layer 1a is carried out in accordance with need. If there is no skin layer on the surface of the rubber material or the presence of the skin layer has no influence on the subsequent process, no removal of the skin layer is necessary.

Figure 2:
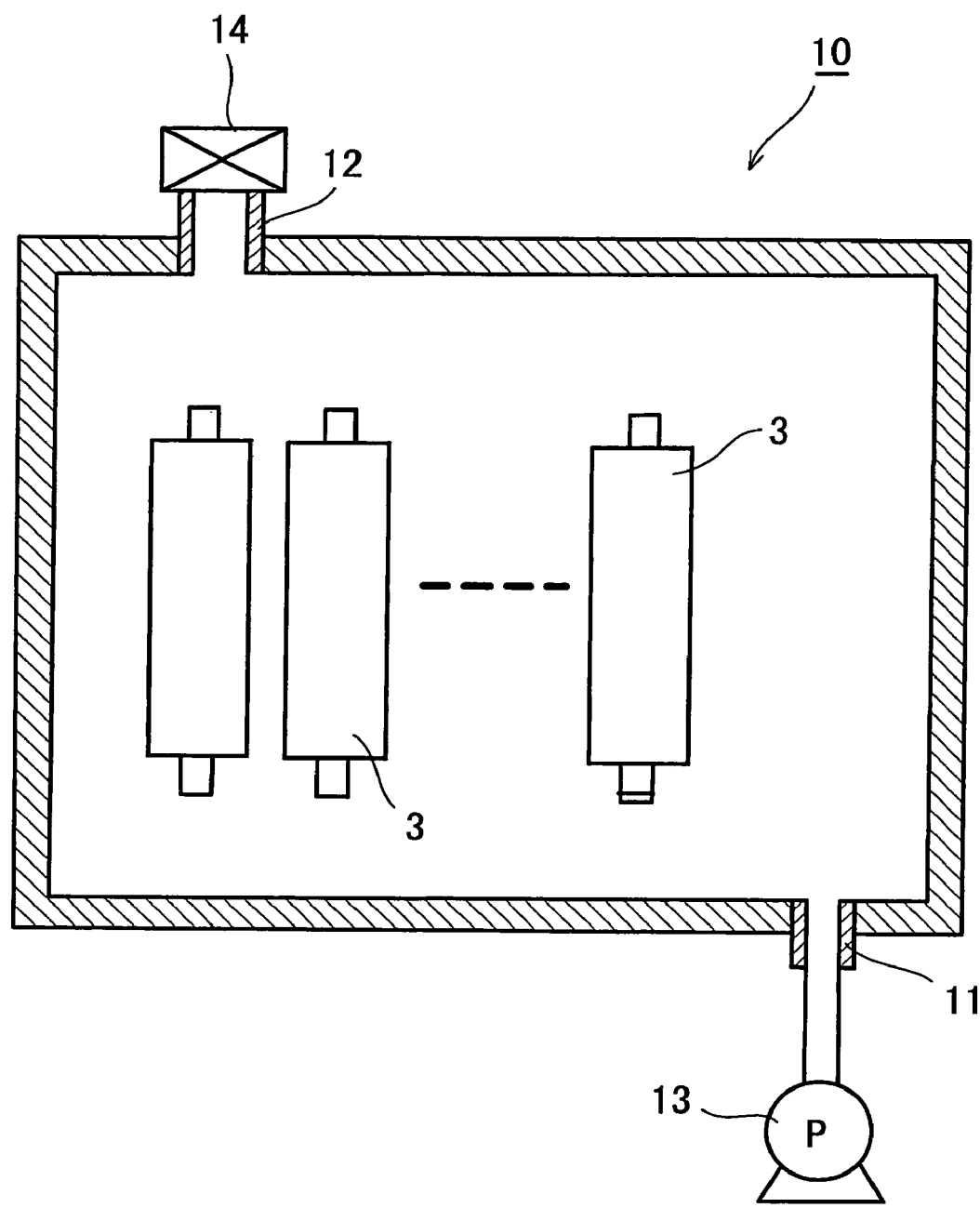
FIG. 2 is an explanatory diagram showing pressurizing and evacuating operations in the present invention.

As shown in FIG. 2, the silicone rubber roller from which the surface skin layer has been removed is introduced in a high pressure chamber 10 in which the pressuring and evacuating operations are repeated. The high pressure chamber can be one which is commercially available wherein the internal pressure can be adjusted in the range of 10 kg/cm$^2$ to 100 kg/cm$^2$. The high pressure chamber 10 has an inlet 11 and an outlet 12, and is connected to a high-pressure pump 13 through the inlet 11. The outlet 12 is provided with a valve 14, so that when the valve 14 is opened, the chamber is rapidly evacuated to reduce the internal pressure to a normal pressure. After a plurality of rubber rollers 3 are arranged in the high-pressure chamber 10, the high-pressure pump 13 is driven to gradually increase the internal pressure of the high-pressure chamber, for example to 50 kg/cm$^2$. The shape of the silicone rubber roller under the high pressure is shown in FIG. 1c.

As the silicone rubber is elastically deformable, the cells in the silicone rubber layer 1 are compressed under the high pressure, so that the volume of the silicone rubber layer is reduced. As the silicone rubber layer 1 is adhered to the shaft 1, no deformation or displacement of the silicone rubber layer 1 occurs in the axial direction of the roller, and thus the silicone rubber layer is strongly compressed in the direction perpendicular to the axis of the roller, i.e., in the radial direction of the roller. In the compressed state, large expansion energy is accumulated in the cells in the silicone rubber layer.

Thereafter, the valve provided in the outlet of the high-pressure chamber is opened. As a result, the internal pressure of the high-pressure chamber 10 is rapidly reduced to the normal pressure. In the evacuating process, the compressed cells in the silicone rubber are rapidly expanded. Due to the rapid expansion of the cells, the separation walls which isolate the cells receive a strong mechanical impact, so that the separation walls are successively destroyed, thus resulting in formation of holes or cracks in the separation walls. Consequently, the cells are connected to each other through the holes or cracks and are accordingly connected to the outside. Thus, the continuous cell silicone rubber layer is transformed into an open cell silicone rubber layer. As the inner side of the silicone rubber layer is adhered to the metal shaft 2 and the outer side of the silicone rubber layer is freely deformable, the expansion energy accumulated in each cell is applied as an impactive force to the roller in the radially outward direction thereof, so that the holes or cracks can be formed in the thin silicone rubber separation walls. Once a large number of pores are formed, the silicone material of which the separation walls are made is freely deformable or displaceable, depending on the external stress. Consequently, the silicone rubber layer becomes more flexible and the rubber hardness is further reduced. If necessary, a plurality of pressurizing operations and a plurality of evacuating operations can be alternately repeated. Namely, there is a possibility that a sufficient amount of independent cells are not converted into pores by one pressurizing operation and one evacuating operation. If this occurs, plural pressurizing operations and plural evacuating operations are alternately carried out to obtain a desired rubber hardness.

Thereafter, the silicone rubber roller is removed from the chamber. The silicone rubber layer 5 is covered by the fluororesin tube 4 to form a highly releasable material layer. For the highly releasable material layer, in place of the fluororesin tube, it is possible to form a fluororesin or fluorolatex coating layer or to apply a liquid RTV silicone to form a coating layer. The pressure roller thus produced is shown in FIG. 1d.

Figure 3:
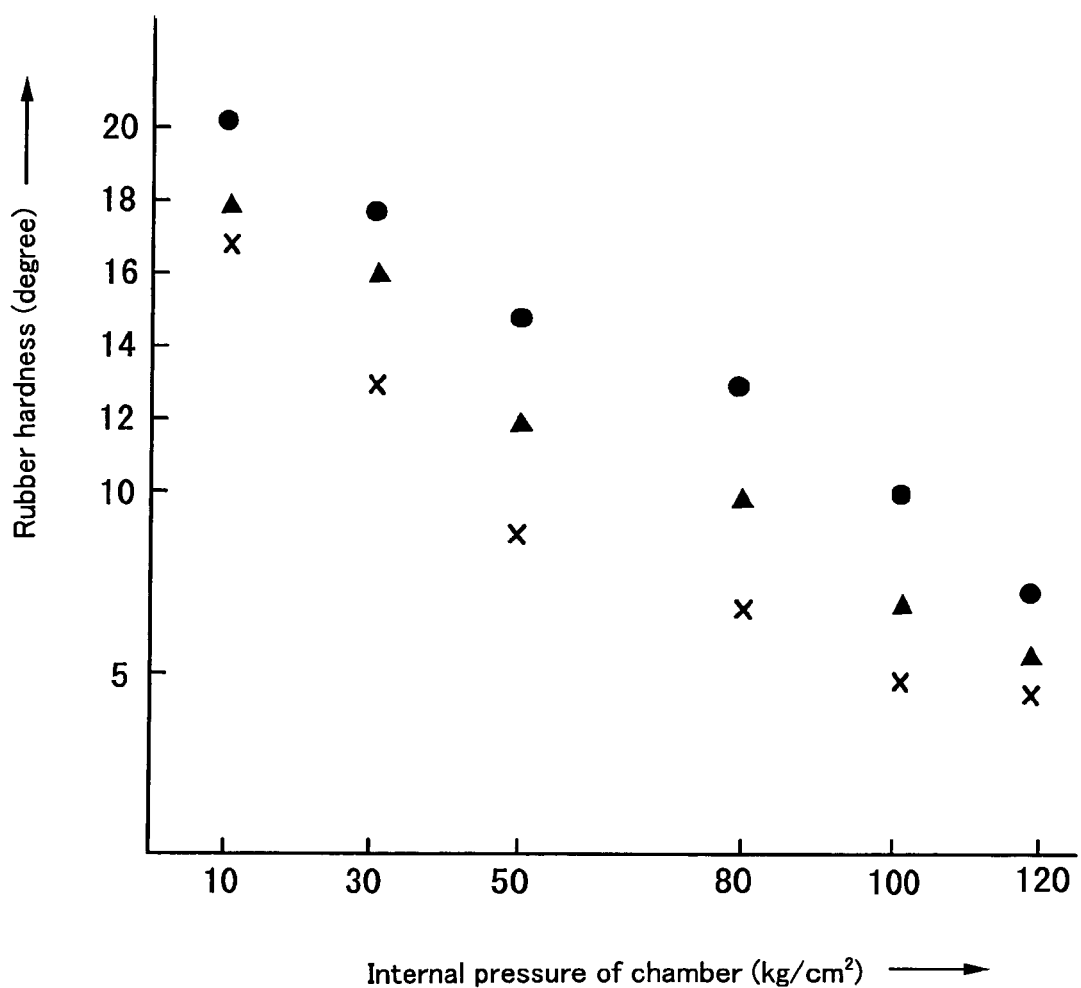
FIG. 3 is a graph showing a relationship between an internal pressure of a chamber and a rubber hardness.

A relationship between the number of the pressurizing and evacuating operations and the rubber hardness will be discussed below. FIG. 3 is a graph which shows a relationship between the internal pressure of the chamber and the rubber hardness, based on the experimental results. In the experiments, the stainless steel shaft having an outer diameter of 8φ and provided on its outer periphery with a continuous cell silicone rubber layer of a thickness of 6 mm and hardness of 20° (ASCA C) was used. In FIG. 3, the abscissa represents the pressure of the chamber and the ordinate represents rubber hardness (ASCA hardness) of the silicone rubber layer of the silicone rubber roller obtained. ● represents data obtained when one pressurizing operation and one evacuating operation were carried out; ▲ represents data obtained when five pressurizing operations and five evacuating operations were carried out; x represents data obtained when ten pressurizing operations and ten evacuating operations were carried out. For example, when the internal pressure was relatively low, e.g., approximately 10 kg/cm$^2$, little change of the rubber hardness occurred when one pressurizing operation and one evacuating operation were carried out. IT has been found that under this internal pressure of approximately 10 kg/cm$^2$, the rubber hardness was reduced by repeatedly carrying out the plural pressurizing operations and plural evacuating operations. When the internal pressure was gradually increased to 50 kg/cm$^2$, the rubber hardness was decreased from 20° to 15° by one pressurizing operation and one evacuating operation. When the internal pressure was increased to approximately 100 kg/cm$^2$, the rubber hardness was decreased from 20° to 10° by one pressurizing operation and one evacuating operation. When ten pressurizing operations and ten evacuating operations were repeated at the internal pressure of 100 kg/cm$^2$, the rubber hardness was decreased to 5° (ASCA C) by ten pressurizing operations and ten evacuating operations. The hardness was not reduced below 5°, even when more than ten pressurizing operations and more than ten evacuating operations were repeatedly carried out at the pressure of 100 kg/cm$^2$. From these experimental results, it has been found that it is useful to repeatedly carry out plural pressurizing operations and plural evacuating operations in order to reduce the rubber hardness. If the internal pressure of the chamber is set in the range of 10 to 100 kg/cm$^2$, a silicon rubber roller having a desired rubber hardness can be obtained. Consequently, a rubber roller having a desired hardness can be obtained by appropriately determining the number of the pressurizing operations and the evacuating operations and the internal pressure of the chamber, depending on the intended rubber hardness. Note that if a rubber material having a higher hardness is used or a rubber material having a smaller foaming factor is used, the internal pressure of the chamber may be set to be not less than 100 kg/cm$^2$ in the pressurizing process.

The manufacturing process of an oil supply roller will be explained below. As the oil supply roller must be heat resistant, a continuous cell silicone rubber is used for the rubber material. As in the manufacturing process of the pressure roller, the metal shaft is inserted in the silicone rubber tube to form a silicone roller. Thereafter, the silicone rubber roller is located in the chamber, and is subjected to the pressurizing and evacuating operations therein to transform the continuous cell silicone rubber into an open cell silicone rubber. After that, the open cell silicone rubber roller is introduced in a vacuum device and silicone oil is externally impregnated in the pores formed in the silicone rubber layer. Thus, an oil supply roller is completed.

The manufacturing process of a toner supply roller will be explained below. An electrically conductive continuous cell EPDM rubber is used as the rubber material for the toner supply roller. As in the manufacturing process of the pressure roller or the oil supply roller, a hollow cylindrical tube of EPDM rubber is prepared and a metal shaft is inserted in the rubber tube. Thereafter, the rubber roller is located in the chamber, and is subjected to the pressurizing and evacuating operations therein to transform the continuous cell EPDM rubber layer into an open cell rubber layer. It has been experimentally confirmed that although the rubber hardness of the continuous EPDM rubber sponge is limited to ASCA C20°, the hardness can be reduced to ASCA C7°, by performing the pressurizing and evacuating operations in the present invention.

What is claimed is:

1. A method for manufacturing a rubber roller including a metal shaft and an open cell rubber material provided on an outer surface of the metal, comprising the steps of:

cutting a predetermined length of a cylindrical hollow foamed rubber tube containing a large number of independent cells which are isolated by separation walls between adjacent ones of the cells, inserting a metal shaft having circular cross section into the cut length of rubber tube to produce a rubber roller having a continuous cell rubber layer containing a number of independent cells, placing said rubber roller in a chamber, increasing internal pressure in the chamber to compress the independent cells in a radially inward direction of the roller and accumulate expansion energy within the continuous cell rubber layer, such that compression forces created are uniformly distributed across the metal shaft, and thereafter decompressing the chamber rapidly to thereby expand the compressed cells in the rubber layer rapidly whereby holes or cracks are formed in the separation walls between the adjacent cells, and the independent cells within the continuous cell rubber layer are transformed into open cells by the expansion force.

2. A method for manufacturing a rubber roller according to claim 1, wherein a plurality of the compressing steps and a plurality of decompressing steps are alternately repeated.

3. A method for manufacturing a rubber roller according to claim 1, wherein in the compressing step, the pressure in the chamber is increased from $10 kg/cm^2$ to $100 kg/cm^2$.

4. A method for manufacturing a rubber roller according to claim 1, wherein prior to the compressing step, an outer periphery of the rubber tube in which the metal shaft has been inserted is ground to remove a surface skin layer on the surface of the rubber tube.

5. A method for manufacturing a rubber roller according to claim 1, wherein the rubber material is selected from the group consisting of silicone rubber, EPDM rubber, and NBR rubber.

6. The method for manufacturing a roller according to claim 1, wherein the metal shaft is adhesively attached to the rubber tube prior to location in the chamber.

7. A method for manufacturing a rubber roller according to claim 1, wherein the rubber material is silicone rubber.

8. A method for manufacturing a rubber roller having a metal shaft and an elastic rubber layer provided on an outer peripheral surface of the metal shaft, comprising the steps of:

cutting a predetermined length of a cylindrical hollow rubber tube made of a continuous cell rubber material containing a large number of independent cells which are isolated by separation walls between adjacent ones of the cells, producing a rubber roller having a continuous cell rubber layer by inserting a metal shaft coated with an adhesive layer in the cylindrical hollow rubber tube, grinding the outer periphery of the rubber layer to remove the surface skin layer formed thereon, compressing the cells in the continuous cell rubber layer by increasing the pressure in a chamber in which the rubber roller from which the coating layer has been removed is located, and decompressing the chamber rapidly to thereby expand the compressed cells rapidly whereby holes or cracks are formed in the separation walls between the adjacent cells, whereby the cells contained in the continuous cell rubber layer are at least partly transformed into pores which are connected to the atmosphere through the holes or cracks.

9. A method for manufacturing a rubber roller according to claim 8, wherein a plurality of compressing steps and a plurality of rapid decompressing steps are alternately repeated.

10. A method for manufacturing a rubber roller according to claim 8, wherein the pressure in the chamber is set in the range of $10 kg/cm^2$ to $100 kg/cm^2$.

11. A method for manufacturing a rubber roller according to claim 8, wherein the rubber material is silicone rubber.

12. A method for manufacturing a pressure roller having a metal shaft used in a heat roll fixing device, comprising the steps of:

producing a silicone rubber roller having a silicone rubber layer by inserting a metal shaft coated with an adhesive layer in a cylindrical hollow tube of a continuous cell silicone rubber having a large number of independent cells isolated by separation walls between adjacent ones of the cells, grinding an outer periphery of the silicone rubber layer to remove a surface skin layer, compressing the cells in the continuous cell silicone rubber layer by increasing the pressure in a chamber in which the silicone rubber roller from which the skin layer has been removed is located, decompressing the chamber rapidly to thereby expand the compressed cells rapidly whereby holes or cracks are formed in the separation walls between the adjacent cells due to the rapid expansion, whereby the cells contained in the continuous cell silicone rubber layer are at least partly transformed into pores which are connected to the atmosphere through the holes or cracks, and attaching a fluororesin tube or forming a fluororesin coating layer onto the outer periphery of the silicone rubber layer having therein pores.

13. A method for manufacturing an oil supply roller having a metal shaft, and a silicone rubber layer formed on an outer periphery of the metal shaft and having a large number of pores connecting to the atmosphere, each pore being filled with a releasing agent, comprising the steps of:

producing a silicone rubber roller having a silicone rubber layer by inserting a metal shaft coated with an adhesive layer in a cylindrical hollow tube of a continuous cell silicone rubber having a large number of independent cells isolated by separation walls, grinding the silicone rubber layer to remove the surface skin layer formed on the outer periphery thereof, compressing the cells in the continuous cell silicone rubber layer by increasing the pressure in a chamber in which the silicone rubber roller from which the skin layer has been removed is located, decompressing the chamber rapidly to thereby expand the compressed cells rapidly whereby holes or cracks are formed in the separation walls between the adjacent cells due to the rapid expansion, whereby the cells contained in the continuous cell silicone rubber layer are at least partly transformed into pores which are connected to the atmosphere through the holes or cracks, and filling the pores formed in the silicone rubber layer with silicone oil.

14. A method for manufacturing a toner supply roller having a metal shaft, and an elastic rubber layer formed on an outer periphery of the metal shaft and having a large number of pores connecting to the atmosphere, said toner supply roller being used to supply a toner to a developing roller, comprising the steps of:

producing an elastic rubber roller having a continuous cell elastic rubber layer by inserting a metal shaft coated with an adhesive layer in a cylindrical hollow tube of a continuous cell rubber, grinding the continuous cell rubber layer to remove the surface skin layer formed on the outer periphery thereof, compressing the independent cells in the continuous cell elastic rubber layer by increasing the pressure in a chamber in which the elastic rubber roller from which the surface skin layer has been removed is located, and decompressing the chamber rapidly to thereby expand the compressed cells rapidly whereby holes or cracks are formed in separation walls between the adjacent cells due to the rapid expansion, whereby the independent cells contained in the continuous cell elastic rubber layer are at least partly transformed into pores which are connected to the atmosphere through the holes or cracks.

15. A method for manufacturing a toner supply roller according to claim 14, wherein a continuous cell EPDM rubber is used for the continuous cell elastic rubber layer.

* * * * *

UNITED STATES PATENT AND TRADEMARK OFFICE
CERTIFICATE OF CORRECTION

PATENT NO. : 7,384,490 B2
APPLICATION NO. : 10/960767
DATED : June 10, 2008
INVENTOR(S) : Nishikawa It is certified that error appears in the above-identified patent and that said Letters Patent is hereby corrected as shown below:

Title page:
   Item (73), "Assignee:", change "Mitsumagiken Co. Ltd." to --Mitsumagiken Co., Ltd.--.
   Item (74), "*Attorney, Agent, or Firm*", change "Associates P.C." to --Associates, P.C.--.

Column 1:
   Line 23 and Line 38, change "press contact mechanism" to --press-contact mechanism--.
   Line 53, change "in an electro photographic" to --in an electrophotographic--.

Column 2:
   Lines 4-5, change "cell type, and accordingly, if" to --cell type and, accordingly, if--.
   Line 28, change "independent from" to --independent of--.
   Line 43, change "invention is to provide" to --invention to provide--.

Column 3:
   Line 17, change "occurs, and therefore the" to --occurs and, therefore, the--.
   Line 39, change "expanded, and consequently, the" to --expanded and, consequently, the--.
   Line 47, change "high pressure atmosphere" to --high-pressure atmosphere--.

Column 4:
   Line 2, change "and the each portion" to --and each portion--.
   Line 59, change "hardness and can be" to --hardness can be--.

Column 5:
   Line 16, change "materials in which" to --materials, in which--.
   Line 18, change "foaming can be used" to --foaming, can be used--.

Column 6:
   Line 45, change "high pressure chamber" to --high-pressure chamber--.
   Line 46, change "The high pressure" to --The high-pressure--.
   Line 49, change "high pressure chamber" to --high-pressure chamber--.

Column 7:
   Line 63, change "carried out. IT" to --carried out. It--.

UNITED STATES PATENT AND TRADEMARK OFFICE
CERTIFICATE OF CORRECTION

PATENT NO. : 7,384,490 B2
APPLICATION NO. : 10/960767
DATED : June 10, 2008
INVENTOR(S) : Nishikawa It is certified that error appears in the above-identified patent and that said Letters Patent is hereby corrected as shown below:

Column 8:
Line 18, change "a silicon rubber roller" to --a silicone rubber roller--.
Line 61, change "outer surface of the metal," to --outer surface of the metal shaft,--.

Column 9:
Line 21, change "increased from 10kg/cm$^2$" to --increased from 10 kg/cm$^2$--.

Signed and Sealed this

Eleventh Day of November, 2008

JON W. DUDAS
*Director of the United States Patent and Trademark Office*